April 12, 1966     F. E. LEHNER ETAL     3,246,291

SEISMOMETER

Filed June 14, 1962     3 Sheets-Sheet 1

FRANCIS E. LEHNER
ROBERT D. GURNEY
WAYNE F. MILLER
ELWIN O. WITT
INVENTORS

BY Lyon & Lyon
ATTORNEYS

April 12, 1966  F. E. LEHNER ETAL  3,246,291
SEISMOMETER
Filed June 14, 1962  3 Sheets-Sheet 2

FRANCIS E. LEHNER
ROBERT D. GURNEY
WAYNE F. MILLER
ELWIN O. WITT
INVENTORS

BY *Lyon+Lyon*
ATTORNEYS

April 12, 1966　　　F. E. LEHNER ETAL　　　3,246,291
SEISMOMETER
Filed June 14, 1962　　　　　　　　　　3 Sheets-Sheet 3
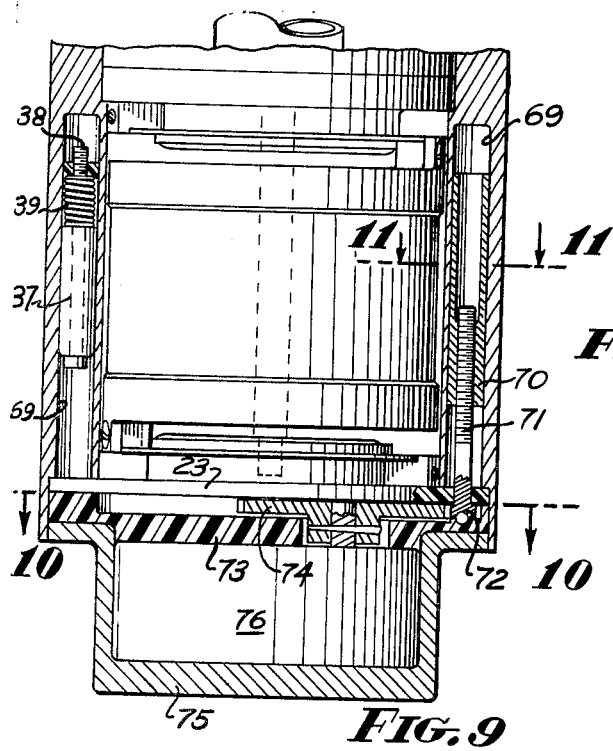
FIG. 9
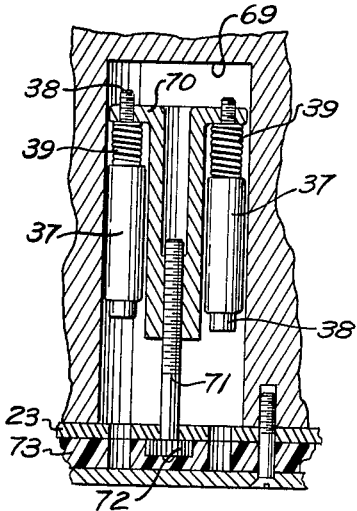
FIG. 11
FIG. 12
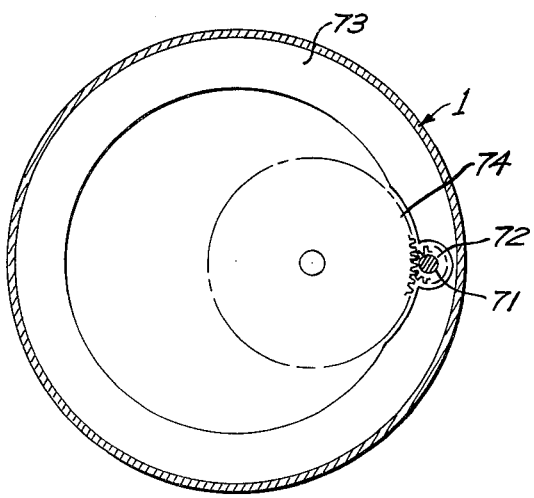
FIG. 10
FRANCIS E. LEHNER
ROBERT D. GURNEY
WAYNE F. MILLER
ELWIN O. WITT
INVENTORS
BY　*Lyon & Lyon*
ATTORNEYS United States Patent Office 3,246,291
Patented Apr. 12, 1966

3,246,291
SEISMOMETER
Francis E. Lehner, Monrovia, Robert D. Gurney, San Jose, Wayne F. Miller, Arcadia, and Elwin O. Witt, Altadena, Calif., assignors to California Institute Research Foundation, Pasadena, Calif., a corporation of California
Filed June 14, 1962, Ser. No. 202,409
7 Claims. (Cl. 340—17)

This invention relates to seismometers. The invention described herein was made in the performance of work under a NASA contract and is subject to the provisions of the National Aeronautics and Space Act of 1958, Public Law 85–568 (72 Stat. 426; 42 U.S.C. 2451), as amended.

Included in the objects of this invention are:

First, to provide a particularly rugged seismometer which may be dropped or lowered by parachute from an airplane or lowered by line from a helicopter on to otherwise inaccessible terrain or submerged area.

Second, to provide a seismometer of this type which incorporates means for automatically compensating for the position in which the seismometer may come to rest; so that the seismometer need not occupy, for example, a vertical position but may occupy an inclined position.

Third, to provide a seismometer, which incorporates novel period adjusting means.

Fourth, to provide a seismometer wherein its period adjusting means may be automatically or remotely controlled to function in effect as a vernier adjustment to compensate for angular positions of the seismometer.

Fifth, to provide a seismometer wherein the sensing element is protected against the shock of impact if the seismometer is to be dropped into position, by surrounding the sensing element with a volatile damping fluid, and incorporating a valve means which is opened at or after impact to vent the damping fluid.

Sixth, to provide a seismometer which is particularly adapted to telemeter its signals in response to seismic disturbances and which incorporates a novel means for causing a periodic identifiable movement of the sensing element so that the operative condition of the seismometer will be apparent.

With the above and other objects in view as may appear hereinafter, reference is directed to the accompanying drawings, in which:

FIGURE 9 is a fragmentary, longitudinal sectional view with portions in elevation showing a motor driven means for vernier adjustment of the position of the inertial or seismic mass.

FIGURE 10 is a transverse, sectional view thereof taken through 10—10 of FIGURE 9.

FIGURE 11 is a fragmentary, sectional view taken through 11—11 of FIGURE 9, and

FIGURE 12 is a fragmentary, sectional view taken through 12—12 of FIGURE 11.

Figure 2:
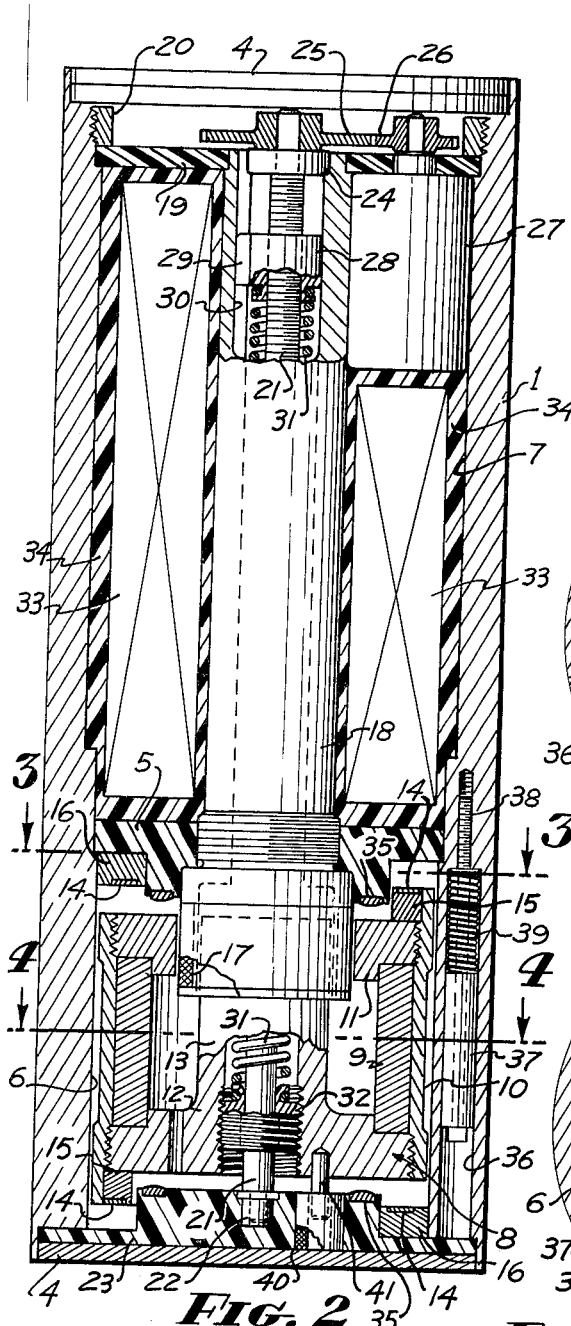
FIGURE 2 is a longitudinal, sectional view through the seismometer with portions shown in elevation.
Figure 1:
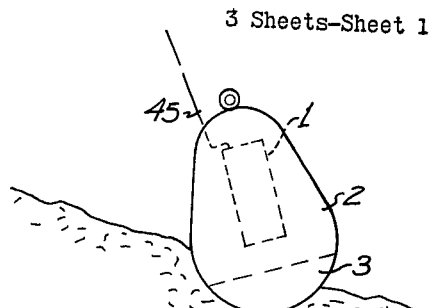
FIGURE 1 is a substantially diagrammatical view of a package in which the seismometer may be mounted, shown in a typical landed position.
Figure 3:
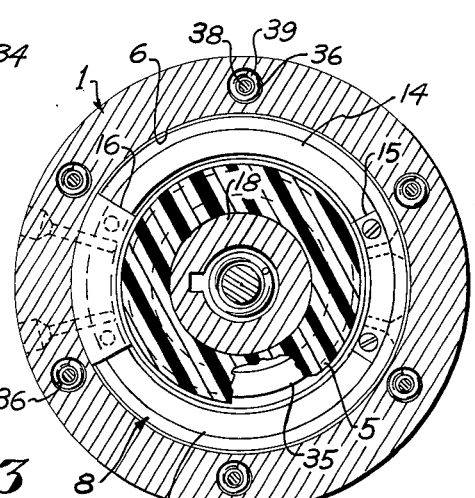
FIGURE 3 is a transverse, sectional view through 3—3 of FIGURE 2.
Figure 4:
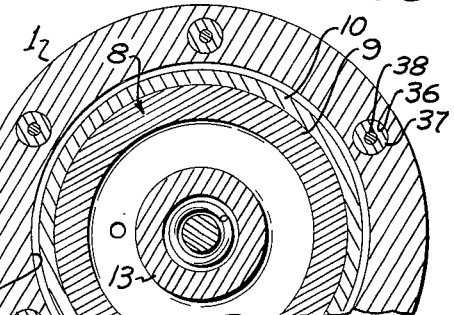
FIGURE 4 is a transverse, sectional view through 4—4 of FIGURE 2.

The seismometer is contained within a cylindrical casing structure 1 formed of non-magnetic material and which in turn may be mounted in a shock resistant case 2 having suitable means for attachment to a line or parachute. Alternatively, the case may be arranged to be dropped freely. The indented bottom end of the case may be provided with a weight 3 so that the seismometer will come to rest in a top-up position. As will be brought out hereinafter, provision is made to compensate for possible angular position of the seismometer.

The casing structure 1 is sealed by end plates 4 and is provided intermediate its ends with a partition ring 5 which divides the casing structure into a sensing element compartment 6 and a power supply compartment 7, the latter compartment containing batteries and electronic components.

Mounted within the sensing element compartment 6 is an inertial or seismic mass 8 which comprises an annular magnet 9 mounted within a retaining sleeve 10. A pole piece ring 11 is screw-threaded into one end of the retaining sleeve 10, the other end of the retaining sleeve is closed by an end wall 12 from which extends a tubular central pole piece 13. The upper end of the pole piece 13 forms with the pole piece ring 11 an annular gap.

The inertial or seismic mass 8 comprising the magnet 9, sleeve 10, pole piece ring 11, end wall 12 and central pole piece 13 moves as a unit and is constrained at opposite ends by a pair of annular springs 14. The springs are connected to the corresponding ends of the retaining sleeve 10 by mounting segments 15 and are connected at diametrically opposite points by mounting segments 16 to the walls of the casing structure 1.

The two segments 15 are disposed at diametrically opposed sides of the sleeve 10 so that the annular springs support the inertial or seismic mass for a limited, essentially axial movement along the axis of the casing structure 1. The side walls of the sleeve 10 clear the internal walls of the sensing element compartment 6 so that the inertial or seismic mass is constrained only by the annular springs 14.

The gap formed between the pole piece ring 11 and central pole piece 13 is adapted to accommodate a sensing solenoid 17 mounted on a tubular support 18 screw-threaded into the partition ring 5. The tubular support extends upwardly through the power supply compartment 7 and through a disk 19 at its upper end which is held in place by a retainer ring 20.

The tubular central pole piece 13 is in coaxial relation with the tubular support 18, a screw shaft 21 extends through the central pole piece 13 and tubular support 18. At its lower end the screw shaft is journalled in a bearing 22 which is supported by a disk 23 underlying the lower end plate. The upper end of the screw shaft is journalled in a bearing 24 and extends through the disk 19 to receive a gear 25 which meshes with a second gear 26 driven by a motor 27 disposed under the disk 19 within the compartment 7.

Screw threaded on the shaft 21 is a traveler nut 28 having key 29 which rides in a key slot 30 formed in the side wall of the tubular support. One end of a suspension spring 31 is secured to the traveler 28. The other end of the suspension spring is secured to an adjustment nut 32 which is screw threaded into the lower end of the central pole piece 13. The suspension spring partially supports the inertial or seismic mass 8. The upward force exerted on the suspension spring is determined by the position of the traveler 28.

The power supply compartment 7 contains, in addition to the motor 27, battery and electronic components 33 indicate diagrammatically in FIGURE 2. These components are immobilized by suitable potting compound 34.

The partition ring 5 and the end disk 23 are provided with central axially extending portions which confront the axial ends of the inertial or seismic mass 8 and are provided with contact rings 35 which are engaged by the inertial or seismic mass 8 when the mass is forced to either axial extremity of its movement with respect to the casing structure 1.

The annular walls of the casing structure 1 are provided with axial bores 36 in the region of the sensing element compartment 6. These bores receive period adjustment magnets 37 which are located in the region radially outward from the annular magnet 9. The period adjustment magnets are adjustable axially with respect to the magnet 9 by means of screws 38. Springs 39 maintain the magnets 37 in a fixed axial position relative to the screws 38. The screws 38 are accessible from the ends of the bores 36 so that the locations of the magnets 37 may be pre-adjusted with respect to the inertial or seismic mass 8.

Mounted in the end disk 23 is a small solenoid coil 40 which forms a testing coil and coacts with a testing coil armature 41 extending axially from the end wall 12 of the inertial or seismic mass. When the testing coil is energized, the inertial or seismic mass 8 is displaced a very small distance which is, however, sufficient for detection by the sensing solenoid 17. The testing coil is energized at predetermined intervals by a pulser 42. The pulser comprises essentially a battery supply and conventional means for periodically closing a circuit between a battery and the testing coil.

The sensing solenoid 17 is connected to an amplifier 43 which in turn is connected to a transmitter 44. The transmitter may be connected to a suitable aerial 45 so that signals from the seismometer may be telemetered. Alternatively, the seismometer may be connected by electrical conductors to conventional recording apparatus, not shown.

Operation of the seismometer is as follows:

The seismometer may be dropped by a parachute or may be freely dropped from an airplane in which case the seismometer is packaged to withstand the landing impact. The seismometer may also be lowered by cable from a helicopter. The seismometer is not limited to placement on the surface of the ground but may also be lowered or dropped into previously prepared bores and still further may be dropped or lowered into water providing that in each case conventional means is provided for transmitting the signals from the seismometer to the recording equipment.

The seismometer may or may not come to rest in a perpendicular position. Therefore, the force required to counter-balance or compensate for the force of gravity on the inertial or seismic mass 8 will vary according to the angular displacement of the seismometer from the vertical. This is accomplished by adjustment of the suspension spring 31. The contact rings 35 are so connected electrically with the motor 27 that should either contact ring be engaged, the motor drives the traveler nut 28 in a direction to increase or decrease the force of the suspension spring until the circuit is broken.

The motor 27 is capable of coasting for a limited period after the circuit is broken so that the inertial or seismic mass moves clear of either contact ring 35. Alternatively an appropriate conventional time delay switch may be utilized to insure an optimum delay in order to insure a proper spacing of the inertial or seismic mass 8 from the contact springs 35. Once the compensator spring has been adjusted for a particular position of the seismometer, the motor 27 need no longer function.

In the event of a seismic disturbance, the casing 1 moves relative to the inertial or seismic mass. This movement may be extremely small, for example, as small as $10^{-6}$ mm. although larger movements are, of course, measurable.

Figure 8:
FIGURE 8 is an idealized tracing as received at a receiving station showing the effect of the pulsing circuit and indicating a typical wave produced by a seismic disturbance.

Whether the information from the seismometer is telemetered or transmitted by electrical conductors, the conventional recording equipment produces a record as represented diagrammatically in FIGURE 8. Normally the record will be essentially a straight line 46 interrupted periodically by small departures 47 caused by the movement of the inertial or seismic mass 8 in response to the pulser 42. This movement need be a small fraction of a millimeter; for example, in the order of $10^{-4}$ mm. In the event of a seismic disturbance, major departures 48 are recorded. The small periodic departures 47 provide a means for indicating that the seismometer is in operative condition and, approximately, its response characteristics.

In the event that the seismometer is to be dropped or otherwise subjected to impact forces prior to its operation, the sensing element chamber 6 may be filled with a damping fluid. The damping fluid is preferably one which is volatile at ambient temperatures and pressures. The clearance between the inertial or seismic mass and the walls of the compartment is such that the damping fluid prevents sudden displacement of the mass. After the seismometer has come to rest, it is desirable to drain the volatile damping fluid from the compartment and allow any fluid that may remain to assume its gaseous phase.

Figure 5:
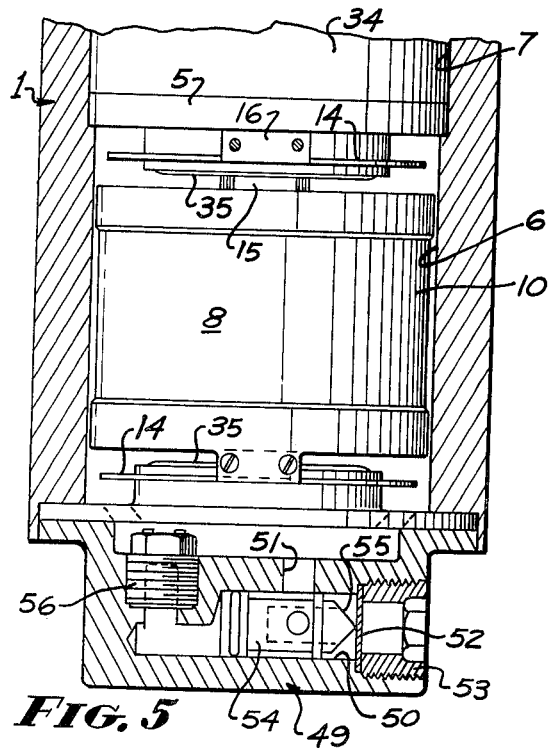
FIGURE 5 is a fragmentary, longitudinal sectional view with portions in elevation showing a means for venting damping fluid from the seismometer.
Figure 7:
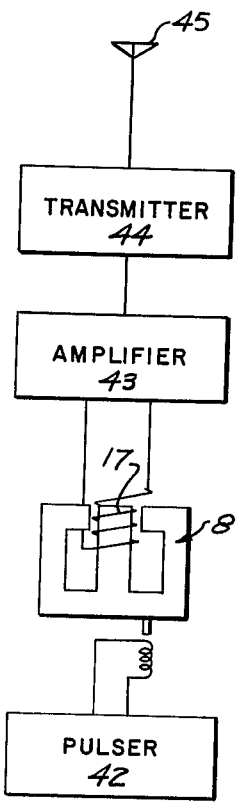
FIGURE 7 is a diagrammatical view of the sensing portions of the seismometer with the associated electronic circuits shown by block diagram.

This may be accomplished as shown in FIGURE 5 by a venting means contained in an end housing 49 which may be substituted for one of the end plates 4. The end housing includes a bore 50 which may extend crosswise to the seismometer and is connected by a passage 51 to the compartment 6. The bore 50 is initially closed by a rupture disk 52 held in place by a retainer ring 53. Mounted in the bore 50 behind the disk 52 is a plunger 54 which carries a blade 55. Located behind the plunger 54 and electrically accessible to the interior of the casing structure is an explosive cartridge or squib 56.

The venting means shown in FIGURE 5 is operated after impact by remote command or on impact by means of a conventional inertia switch not shown. The explosive cartridge drives the blade 55 of the plunger 54 through the rupture disk 52 so that the damping fluid may bleed from the chamber 6.

Figure 6:
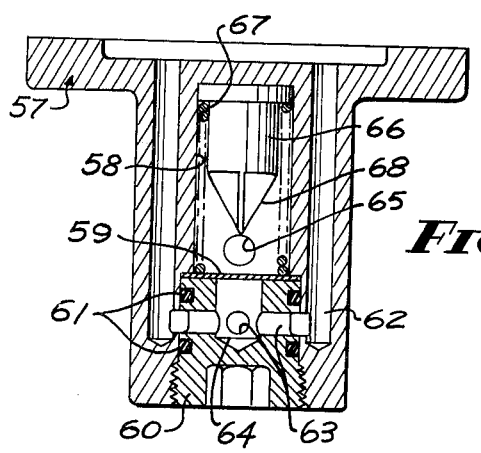
FIGURE 6 is a longitudinal, sectional view showing a modified means for venting damping fluid from the seismometer.

An alternative arrangement for bleeding or venting the damping fluid is illustrated in FIGURE 6. In this case an end housing 57 is substituted for the lower end plate 4. The end housing includes an axially extending central bore 58 which is closed by a rupture disk 59 held in place by a retainer plug 60. The retainer plug is provided with spaced sealed rings 61 defining an isolated zone which is connected by axial passage 62 to the compartment 6 and by radial passages 63 to a socket 64 underlying the rupture disk 59. Vent passages 65 bleed from the bore above the rupture disk 59. An initially actuated plunger 66 is held at the upper end of the bore 58 by a spring 67. The lower end of the plunger 66 is provided with a rupture blade 68. On impact, the blade 68 pierces the disk 59 so as to allow the damping fluid to escape through the vent passages 65.

The period adjustment magnets function as follows:

The period increasing magnets 37 are disposed in a concentric ring about the inertial or seismic or suspended mass magnet 8. The polarity of the suspended mass magnet and the period increasing magnets are in opposition, and are so relatively proportioned that a magnetic force exits which, with relative displacement of the mass, tends to aid the displacing force. This magnetic force is an instability force which is less than, and in opposition to, the restoring force of the suspension spring, and has the effect of decreasing the net spring constant. Decrease in the net spring constant produces an increase in the period. In various tests, the period has been extended from, for example, approximately 0.4 second to 1.0 seconds, and from 0.6 second to 6.0 seconds.

Reference is now directed to FIGURES 9–12. In some instances it is desirable to effect automatic or remote adjustment of one, two or more of the period adjustment magnets 37 for the purpose of vernier mass position adjustment. This may be accomplished by circumferentially enlarging one or more of the bores 36 so as to provide a wall cavity 69. Within the wall cavity, there is slidably mounted a frame 70 supported by a screw shaft 71 which extends through the end disk 23 and terminates in a gear head 72. The gear head is retained in place by a gear plate 73 which also accommodates a motor driven gear 74. An end housing 75 is substituted for the lower end housing 4. The end housing 75 accommodates a motor 76 connected to the gear 74.

Operation of the motor in one direction or the other moves the frame 70 longitudinally in the cavity 69, that is, in a direction parallel to the axis of the intertial or seismic mass 8. The frame supports one or more period adjustment magnets 37. The magnets may be fixed to the frame or capable or pre-adjustment with respect to the frame. In the latter case the magnets may be supported by screws 38 and held against the heads of the screws by means of springs 39 corresponding to the arrangement shown in FIGURE 2.

By the above means, in addition to the function of adjusting the period of the inertial or seismic mass 8, these magnets may also tend to function as a vernier adjustment of the force obtained principally from the spring 31. That is, these magnets may have the effect of exerting an axial force on the inertial or seismic mass 8 which may be in concert with or in opposition to the spring 31.

Having thus described certain embodiments of our invention, we do not wish to be limited thereto but desire to include in the scope of our invention all novelty inherent in the appended claims.

We claim:

1. A seismometer, comprising:
   (a) an encasing structure;
   (b) an inertial mass within said structure;
   (c) a yieldable support for said mass limiting said mass to reciprocal movement along a single axis with respect to said encasing structure;
   (d) means for compensating for the effect of gravity on said mass including a spring, a motor drive to change the effective force exerted by said spring, and control means responsive to predetermined axial movement of said mass in either direction to restore said mass to an intermediate position;
   (e) and means for detecting relative movement of said mass and encasing structure.

2. A seismometer, comprising:
   (a) an encasing structure;
   (b) an inertial mass within said structure;
   (c) a yieldable support for said mass limiting said mass to reciprocal movement along a single axis with respect to said encasing structure;
   (d) means for compensating for the effect of gravity on said mass including a spring, a motor drive to change the effective force exerted by said spring and control means responsive to predetermined axial movement of said mass in either direction to restore said mass to an intermediate position;
   (e) means for detecting relative movement of said mass and encasing structure;
   (f) a device within said encasing structure for producing a predetermined movement of said mass;
   (g) and a pulsing control for said device within said encasing structure to cause said movement at predetermined intervals.

3. A seismometer, comprising:
   (a) an encasing structure;
   (b) an inertial mass within said structure;
   (c) a yieldable support for said mass limiting said mass to reciprocal movement along a single axis, with respect to said encasing structure;
   (d) means for compensating for the effect of gravity on said mass including a spring, a motor drive to change the effective force exerted by said spring, and control means responsive to predetermined axial movement of said mass in either direction to restore said mass to an intermediate position;
   (e) means for detecting relative movement of said mass and encasing structure;
   (f) and means for varying the effective period of said mass.

4. A seismometer, comprising:
   (a) an encasing structure;
   (b) an inertial mass within said structure;
   (c) a yieldable support for said mass limiting said mass to reciprocal movement along a single axis with respect to said encasing structure;
   (d) means for detecting relative movement of said mass and encasing structure;
   (e) a volatile damping fluid initially surrounding said mass to cushion said mass in the event of impact;
   (f) and means for venting said fluid to permit operation of said mass.

5. A seismometer, comprising:
   (a) an encasing structure;
   (b) a magnetic inertial mass
   (c) means for yieldably supporting said mass within said encasing structure for movement relative thereto along an essentially single axis;
   (d) a coaxial sensing coil fixed to said structure to detect relative movement of said mass;
   (e) a coaxial suspension spring connected between said mass and casing;
   (f) and motor driven means for changing the effective force of said spring to compensate for the angular relation between an axis perpendicular to the earth and the axis of movement of said magnetic mass.

6. A seismonometer, comprising:
   (a) an encasing structure;
   (b) a magnetic inertial mass;
   (c) means for yieldably supporting said mass within said encasing structure for movement relative thereto along an essentially single axis;
   (d) a sensing coil fixed to said structure to detect relative movement of said mass;
   (e) a volatile damping fluid initially surrounding said mass to cushion said mass in the event of impact;
   (f) and means for venting said fluid to permit operation of said mass.

7. A seismometer, comprising:
   (a) an encasing structure;
   (b) a magnetic inertial mass;
   (c) means for yieldably supporting said mass within said encasing structure for movement relative thereto along an essentially single axis;
   (d) a sensing coil fixed to said structure to detect relative movement of said mass;
   (e) contact means confronting opposite axial ends of said inertial mass;
   (f) a spring for suspending said inertial mass between said contact means;

(g) a motor, and means driven thereby for varying the effective forces of said spring, said motor being operatively connected with said contact means to cause said spring to dispose said inertial mass clear of both of said contact means.

References Cited by the Examiner

UNITED STATES PATENTS

| | | | |
|---|---|---|---|
| 2,348,225 | 5/1944 | Petty | 340—17 |
| 2,405,439 | 8/1946 | Lubbock et al. | 137—67 |
| 2,408,478 | 10/1946 | Petty | 340—17 |
| 2,562,983 | 8/1951 | Clewell | 340—17 |
| 2,788,511 | 4/1957 | Marshall | 340—17 |
| 2,949,026 | 8/1960 | Gindes et al. | 73—517 |
| 3,054,085 | 9/1962 | Alexander | 73—71 |

BENJAMIN A. BORCHELT, *Primary Examiner.*

CHESTER L. JUSTUS, *Examiner.*

J. W. MILLS, G. H. GLANZMAN, *Assistant Examiner.*